(12) United States Patent
Wimmer et al.

(10) Patent No.: US 6,726,274 B2
(45) Date of Patent: Apr. 27, 2004

(54) OPENABLE MOTOR VEHICLE ROOF WITH IMPROVED SLIDING HEAD LINER GUIDE ARRANGEMENT

(75) Inventors: Ingrid Wimmer, Gauting (DE); Martin Kiedl, Munich (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/187,426

(22) Filed: Jul. 2, 2002

(65) Prior Publication Data

US 2003/0067192 A1 Apr. 10, 2003

(51) Int. Cl.[7] .................................................. B60J 7/00
(52) U.S. Cl. ....................................................... 296/214
(58) Field of Search ............................................ 296/214

(56) References Cited

U.S. PATENT DOCUMENTS 4,883,311 A  * 11/1989  Kohlpaintner et al. ...... 296/213
6,189,960 B1 *  2/2001  Mumura et al. ............ 296/212
6,309,013 B1   10/2001  Staltmayer et al.

FOREIGN PATENT DOCUMENTS

DE          81 07 603.7 U      8/1981

* cited by examiner

*Primary Examiner*—Dennis H. Pedder
(74) *Attorney, Agent, or Firm*—Nixon Peabody LLP; David S. Safran

(57) ABSTRACT

An openable motor vehicle roof is provided which includes a sliding head liner moveable between a raised position, a closed position and an open position. The sliding head liner is guided on a partially flexible guide element which has a movable end entrained during motion of the cover into its raised position.

12 Claims, 3 Drawing Sheets

OPENABLE MOTOR VEHICLE ROOF WITH IMPROVED SLIDING HEAD LINER GUIDE ARRANGEMENT

BACKGROUND OF THE INVENTION

1. Field of the Invention

This invention relates to an openable motor vehicle roof, for example for a passenger car or a camper or even a camping trailer. Openable motor vehicle roofs are known in a variety of versions. Generally they are used in passenger cars to improve ventilation of the vehicle interior. To do this, openable motor vehicle roofs generally have a cover which can close the opening in the motor vehicle roof and can be raised out of this cover closed position into a cover raised position. In the cover raised position, the cover is raised on at least one side edge relative to the motor vehicle roof so that a ventilation slot is formed. Optionally, these covers can generally be moved over or under the solid roof.

2. Description of the Prior Art

The present invention relates to an openable motor vehicle roof with a sliding head liner which can cover the cover, for example a transparent glass cover, in the cover closed position toward the motor vehicle interior and, moreover, to a certain extent, can follow the cover into the cover raised position, therefore for its part can be moved concomitantly into the raised position of the sliding head liner. In this way, the cover and sliding head liner can jointly clear a ventilation slot.

Moreover the sliding head liner, as the name indicates, can be slid from its closed position in the direction parallel to the roof laterally into its open position so that the cover, or at least a large part of it, is cleared by the sliding head liner. In this way the vicinity can be viewed from within the vehicle interior, for example, through a glass cover and the light conditions in the vehicle interior are improved.

U.S. Pat. No. 6,309,013 discloses an openable motor vehicle roof in which the sliding head liner, with respect to its motion between its closed position and open position, is guided and held using an elongated guide element, along which it can be pushed. The particularity of this openable motor vehicle roof is that part of the guide element is concomitantly moved when the sliding head liner is moved between its raised position and its closed position. This involves the end of the guide element which is assigned to the side of the sliding head liner and the side of the cover which is to be raised. In the area away from this end, the guide element is held stationary in the direction which is vertical with respect to the roof. The mobility of the guide element is intended to enable motion of the sliding head liner between its open position and its raised position with the cover raised. The guide element performs its task therefore not only with the cover closed, but also in the raised state. These additional possibilities have proven effective in practice and are well accepted by users. The ventilation function is improved in this openable motor vehicle roof compared to alternative embodiments in which the sliding head liner must be pushed a distance largely parallel to the roof to establish a ventilation slot with the cover raised or has ventilation slots installed for ventilation purposes. Moreover, the vehicle passengers can better visually perceive the raised position of the cover.

SUMMARY OF THE INVENTION

The object of the invention is to improve an openable motor vehicle roof with respect to guiding a sliding head liner.

This object and other objects are achieved by providing openable motor vehicle roof, comprising at least one cover which can close a roof opening and which can be raised out of a cover closed position into a cover raised position; a sliding head liner located under the at least one cover and moveable concomitantly out of a closed position into a raised position when the at least one cover is raised with the sliding head liner, so that the at least one cover and the sliding head liner jointly clear a ventilation gap, the sliding head liner being slideable furthermore from its closed position into an open position so that the sliding head liner can clear the cover or the roof opening at least for a large part, an elongated guide element along which the sliding head liner can be moved into and out of its open position and including a movable end on which the sliding head liner is held in its closed position and, in the liner raised position, is entrained during motion of the sliding head liner between the closed and raised positions, the elongated guide element including a stationary area and a transition area between the stationary area and the movable end; a movable holding device mounted on the elongated guide element to hold the sliding head liner on a side on which the sliding head liner can clear the ventilation gap in the raised position of the sliding head liner, the sliding head liner being pushed in the stationary area away from the movable end through which or into which the holding device is pushed during motion into the open position of the sliding head liner, in the direction perpendicular to the roof and is held stationary with respect to the roof, wherein the guide element is flexible at least in the transition area between the stationary area and the movable end.

The present invention consists especially in that the guide element is flexible at least in the transition area between the area which is held stationary and the movable end. The particularity of the openable motor vehicle roof therefore consists in that, instead of the conventional multi-part guide element which is made hinged between these parts, now a guide element which is flexible in the area between the (vertically to the roof) stationary area of the guide element and the movable end is used. The hinges of the conventional guide element can be replaced by the flexibility of this guide element area. This simplifies the structure of the guide element and thus also of the entire openable motor vehicle roof with the corresponding associated cost advantages. Moreover, hinges are components which require maintenance in terms of lubrication and sensitivity to dirt; this does not apply to a flexible guide element area with suitable material choice.

As used herein, the expression "large part" which can be cleared by the sliding head liner which can be moved into its open position relates to the format of a sliding head liner or cover. For openable motor vehicle roofs with several combined covers, under certain circumstances this can be less than most of the roof opening. Openable motor vehicle roofs are also conceivable in which there are several sliding head liners, and, in that case, the aforementioned statements for one of the sliding head liners applies preferably to all sliding head liners. Then the term "large part" also relates to the format of the individual sliding head liner.

Generally, openable motor vehicle roofs have a structure such that the cover can be raised on exactly one side relative to the roof and remains on the opposite side essentially at roof level. In doing so, the sliding head liner will be raised on the side assigned to the side of the cover which is to be raised. But the invention relates also to other processes, for example to covers which can be raised on all sides. The guide element construction of the present invention must be provided on at least one side of the sliding head liner.

The movements of the cover and the sliding head liner can take place by hand or motor. This is not detailed herein since different possible versions and drive techniques are familiar to one skilled in the art. But it is preferable that the motion of the sliding head liner out of its closed position into its raised potion takes place by the corresponding motion of the cover, the sliding head liner thus being entrained with the cover. This applies of course only to the situation in which the sliding head liner was in its closed position before. If it was in its open position beforehand, it is preferably decoupled from the movement of the cover into the raised position.

One important advantage of the invention is that due to the flexible execution of the transition area between the (perpendicular to the roof) stationary area of the guide element and the movable end, a one-piece execution of the guide element can be achieved. In this way the guide element can be built especially simply and is easy to install. At least the area of the guide element, in which the holding device which holds the sliding head liner on the guide element can be pushed, is preferably made in one piece. This has the advantage of largely preventing noise during the movements with which the movable holding device moves along the guide element, especially discontinuous noise. This noise can hardly be prevented in multi-part guide elements and transitions between the parts and creates the impression in the user that the roof is "rattling" and possible a defect or at least loose parts may be feared. Conversely the grinding or rolling noises which may occur during displacement are less disturbing. It should be noted here that the movable holding device could also be moved by rolling along the guide element, but in a simpler and preferred case however it slides.

The guidance of the sliding head liner over the aforementioned movable holding device on the guide element can be executed in a variety of ways with respect to the shaping of the participating elements. But it is preferably in this invention that the guide element has a crowned cross sectional profile. Here the term "crowned" also comprises polygonal corner profiles and also parts of otherwise uncrowned profiles such as the crossbeams in a T-profile. This profile can be encompassed by a suitable holding device so that it can be pushed along the profile. In the simplest case, it is an at least partially circular cross sectional profile. A concave cross sectional profile of the guide element is also possible. In any case, there must be a guide in the directions perpendicular to the direction of displacement.

Furthermore, the guide element in any case is made in the flexible transition area preferably as a flexible metal rod (which in the simplest case has the aforementioned crowned cross section).

The movable end of the guide element can be stiffened so that the flexible properties which would otherwise be present, for example as the result of a one-piece execution with a flexible transition area, are cancelled by the stiffening. In this way a fixed shape of the movable end which is preserved during the various movements can be defined. For example, there can be a straight shape of the movable end over a certain section which is oblique in the raised position of the sliding head liner such that it dictates the rise of the pertinent side of the sliding head liner into its raised position when it is moved out of the open position of the sliding head liner. The transition from this oblique straight section of the guide element into the area which runs otherwise essentially parallel to the motor vehicle roof can be accomplished then by a flexible transition area.

For example, the aforementioned metal rod can be produced as a rolled section which, in addition to a crowned, inherently flexible cross sectional profile portion, has a further stiffening cross sectional profile portion, for example a lateral "lug". The stiffening cross sectional profile portion can be removed by punching it out or in some other way at certain locations in order to produce separation between the flexible transition area and the aforementioned stiffened section of the movable end. The stiffening cross sectional profile portion can also be used, for example, to attach the stationary section of the guide element.

To improve the sliding properties, the guide element can be provided with a plastic coating. Here the plastic coating can also contribute to stiffening. The plastic can be sprayed onto the guide element. The plastic can also be responsible solely for the guidance properties, while a metal part or metal cores, for example a leaf spring, contributes only to establishing the flexible properties.

In the aforementioned version in which the cover can be moved into its open position, it is generally desirable for the sliding head liner to be entrained when the cover is moving into the cover open position. In this invention, this can take place preferably by the cover being connected via a carrier to the guide element which lies on the side of the movable holding device of the sliding head liner facing the movable end so that, when the cover is moved towards its open position, it strikes this holding device and thus entrains the sliding head liner in this direction. The sliding head liner should be entrained such that it essentially clears the part of the roof opening which has been opened by the cover.

The motion of the cover from its closed position into its raised position should preferably likewise entrain the sliding head liner into the raised position of the sliding head liner if the sliding head liner was previously in its closed position. To do this, the aforementioned carrier may be coupled to the cover or the means for raising the cover such that when it moves into the cover raised position, it entrains the movable end of the guide element and thus also the sliding head liner, i.e. via the aforementioned movable holding device of the sliding head liner. One possibility consists in that the carrier is attached or coupled to a control lever of a conventional water gutter which in turn is coupled to the raising motion of the cover.

In conjunction with the aforementioned fact that the guide element is made in one piece in the areas which can be encompassed by the holding device, it was explained that the lack of noise can be an important quality feature of the raisable roof of the present invention. Another aspect of the low noise relates to the movable end of the guide element in those situations in which it is not held in some other way. For example, in the above explained versions, it is held by a carrier which is coupled to the cover, when the cover is in its raised position or its closed position. But if the cover is in its open position, the carrier can be pushed along the guide element away from the movable end so that this could cause rattling noise if it remains freely movable. It is preferably intended in the present invention that a holding means for the guide element be attached which stops the free mobility which leads to noise. This can be for example a magnet which can hold one magnetic part of the movable end of the guide element. In this way the carrier can easily also release the movable end when it is to be entrained into the raised position.

DETAILED DESCRIPTION OF THE PREFERRED EMBODIMENTS

Figure 1:
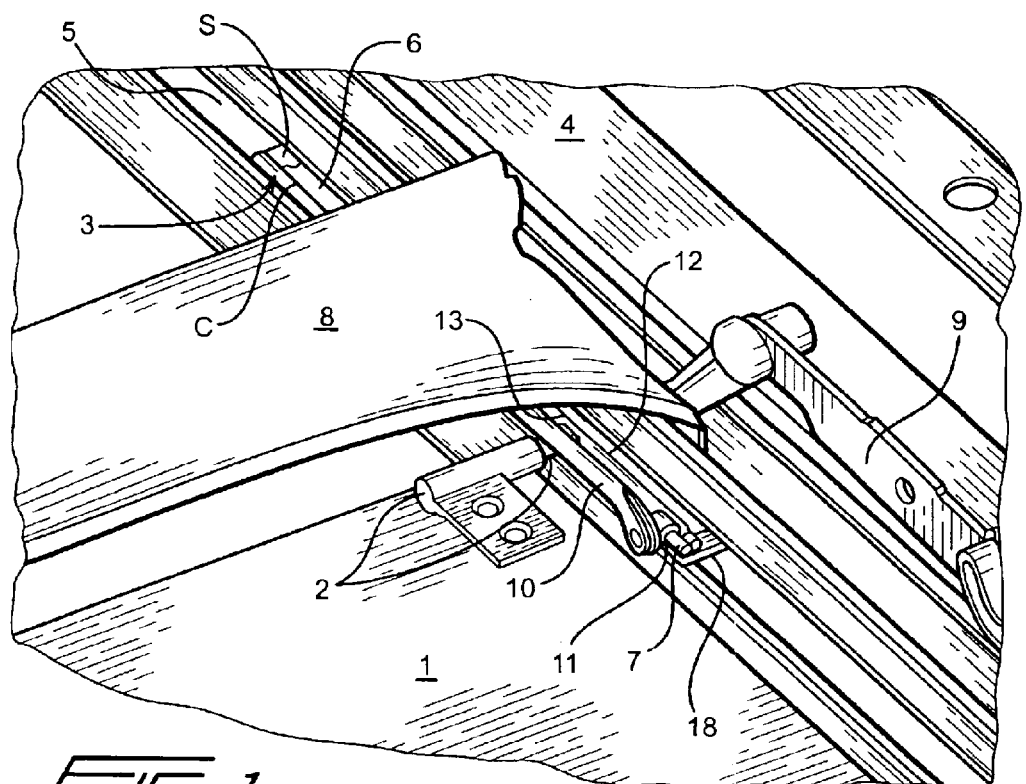
FIG. 1 shows a partial view of a motor vehicle roof in a perspective, the cover being omitted, in the cover closed position and the closed position of the sliding head liner.
Figure 5:
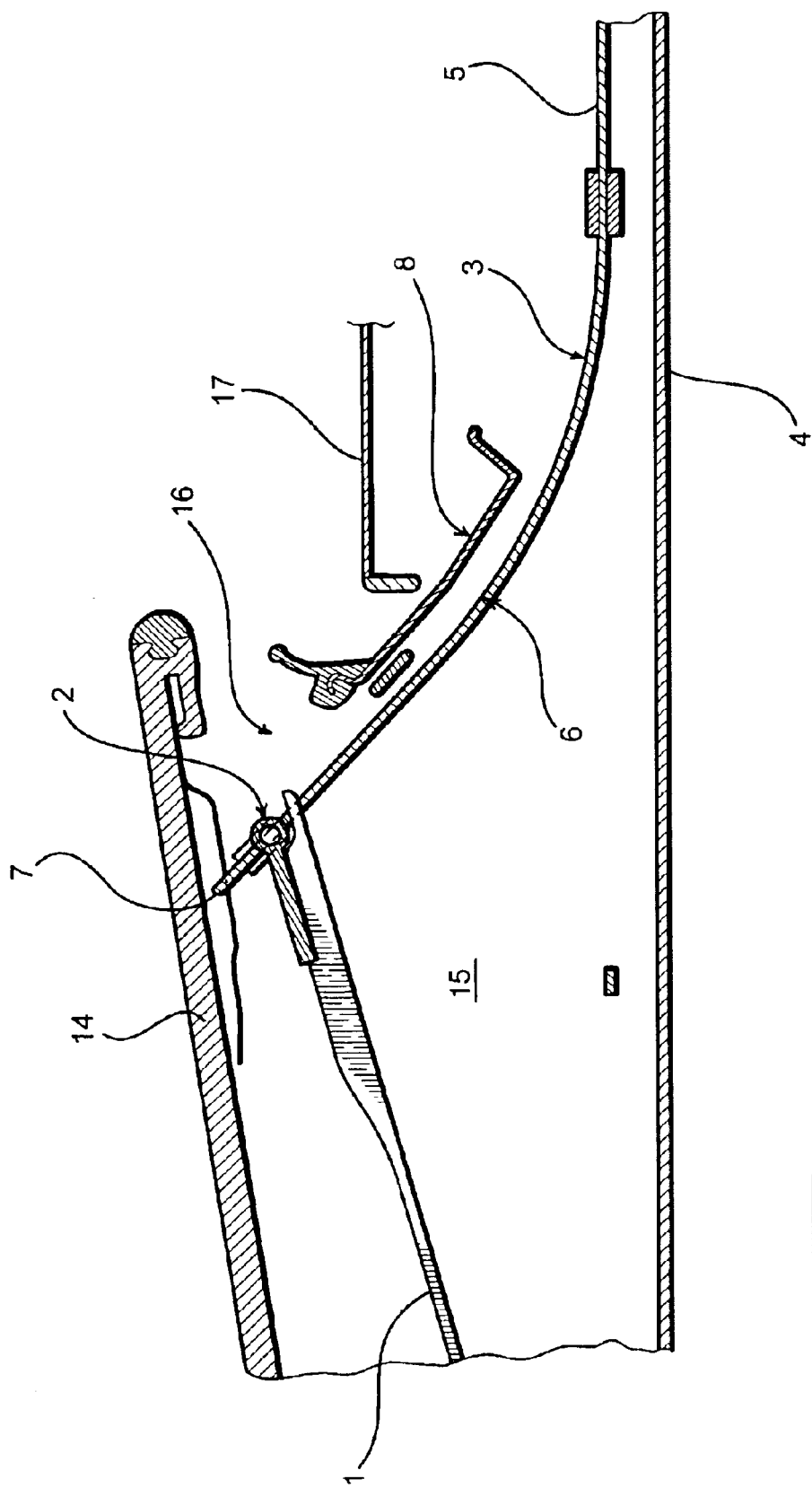
FIG. 5 shows a partial lengthwise section through the rear part of the motor vehicle roof in the position as shown in FIG. 2.

FIG. 1 shows the position of the parts important to the present invention with the cover 14 (FIG. 5) closed and the sliding head liner 1 closed. Here the sliding head liner 1 in the area of its rear edge is movably held via a holder 2 on an elongated, rail-like guide element 3 which in the embodiment is made as a plastic-coated metal rod. The guide element 3 has a section 5 which is mounted stationary relative to the motor vehicle roof 17 (FIG. 5). This section finally adjoins a flexible section 6 and a movable end 7.

The cover 14 of the openable motor vehicle roof is shown only in FIG. 5 because in the other figures it would almost completely hide the illustrated components. A gutter 8 is assigned to the cover 14 and it can catch water which may penetrate into the ventilation gap 16 which is cleared by the raised rear edge of the cover 14 and can drain it into side gutters on the frame. The gutter 8 moves with the cover 14 into its various positions. The movements of the cover 14 are controlled by a lever rod 9 which is driven via a crank control which can be recognized as attachments on the right edge in FIG. 1 and which is known.

A control lever 10 is mounted on the gutter 8 and it takes part in the movements of the gutter 8 which are driven by the lever mechanism 9. On the end of the control lever 10 which is remote from the gutter, a carrier 11 is held to be able to move around a horizontal axis. The movable end 7 of the guide element 3 is entrained by the motion of the gutter 8 via the control lever 10 and the carrier 11 when the cover 14 moves into the raised position, as is especially apparent from FIGS. 2 and 3. In doing so the carrier 11 remains in the outermost area of the movable end 7 of the guide element 3. Therefore the holding device 2 of the sliding head liner 1 which is likewise movably guided on the guide element 3 can be pushed with the sliding head liner 1 along the guide element 3 until the holding device 2 strikes the carrier 11 (which is the case in FIG. 2). In doing so the guide element 3 with its flexible transition area 6 between the permanently mounted area 5, which runs parallel to the motor vehicle roof 17, and the movable end 7, depending on the location of the control lever 10, forms a path with a different shape. For a closed cover 14 or one pushed on the path into its open position (compare FIGS. 1 and 4), this path is straight so that the sliding head liner 1 can be pushed back and forth between its open position and the position which corresponds to its closed position in FIG. 1 and which is determined by striking the carrier 11. This takes place in this embodiment manually using a handle depression on the sliding head liner 1, which depression is on the interior side and is not shown, but can also take place motorized.

The end of the gutter 8 facing away from the visible part of the control lever 10 is coupled to a guide shoe (hidden in the figures) which can be moved along the mounting rails 4 and forms part of the movement mechanism of the cover 14. It is stationary in the vertical direction. The edge of the cover which cannot be raised is likewise movable along the mounting rails 4, but is supported stationary perpendicular to it. The same applies to the front side of the sliding head liner 1 which is not shown. These details are not examined here because they do not differ in a relevant manner from the conventional openable motor vehicle roofs.

Figure 2:
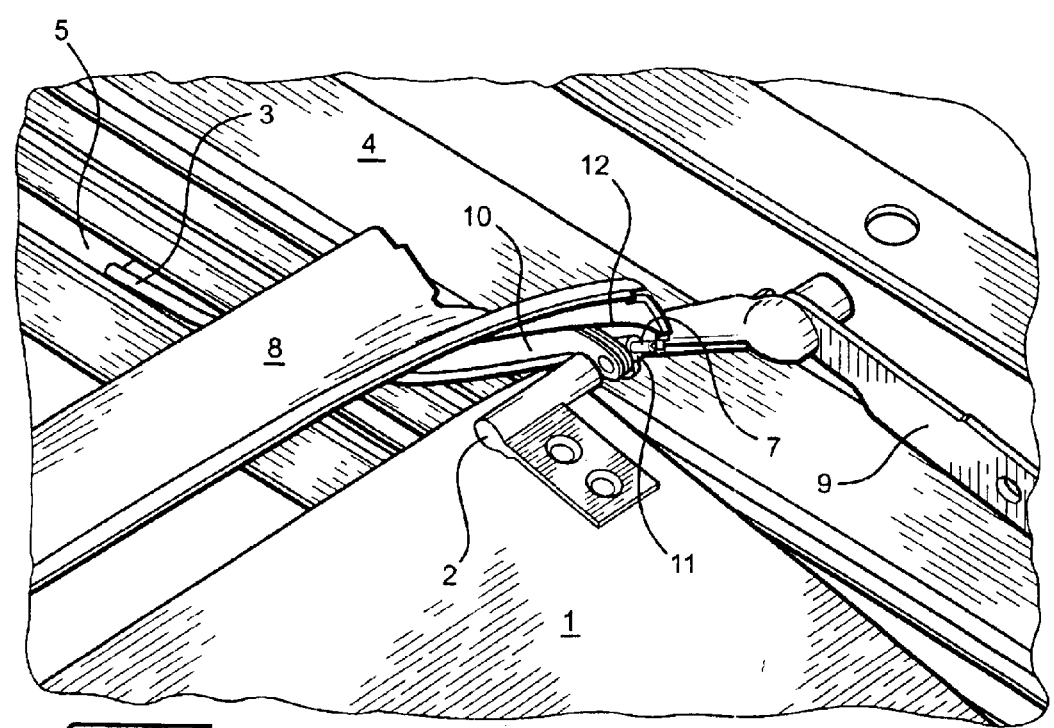
FIG. 2 shows a partial view analogous to FIG. 1 in the cover raised position and the raised position of the sliding head liner.
Figure 3:
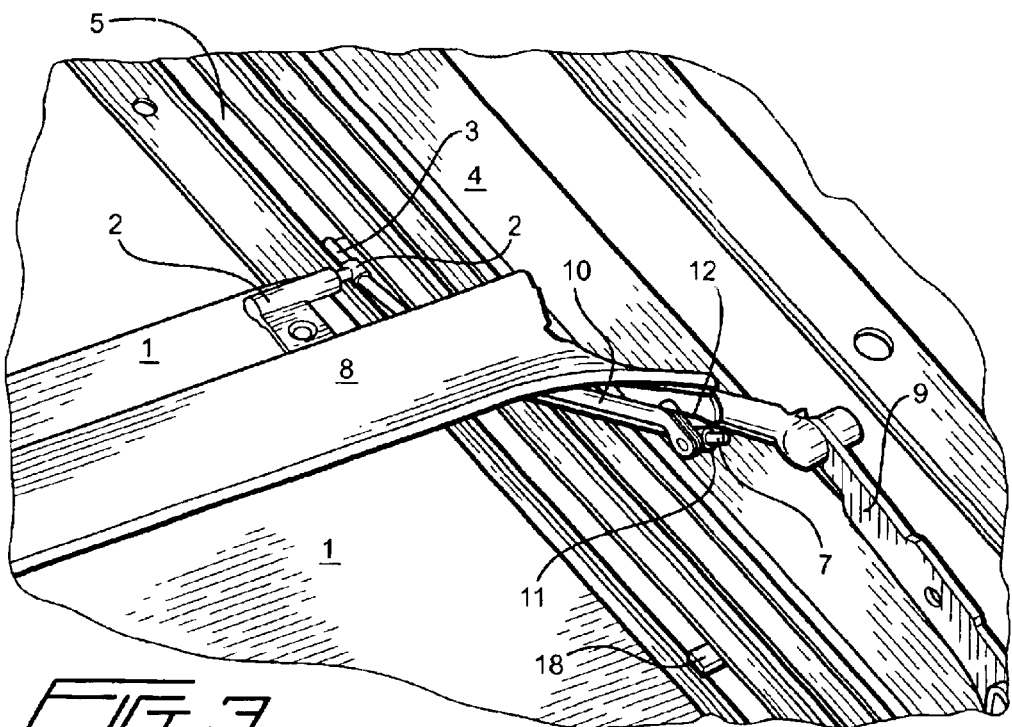
FIG. 3 shows a partial view analogous to FIG. 1 in the cover raised position and with the sliding head liner pushed back a distance in the direction to its open position.

When the control lever 10 is raised obliquely by the raising of the cover 14 the flexible area 6 of the guide element 3 is curved, as shown in FIGS. 2 and 3. The movable end 7 remains straight, as a result of the stiffening by a lug-like structure 12 which is attached in this area on the side of the guide element 3 facing away from the control lever 10. This is a plastic part which has a plastic coating which has been preferably sprayed on.

A plastic spacer 13 which is shown in some figures is attached to the end of the lug-like structure 12 facing the flexible transition area 6 and is supported on the gutter 8 when the movable end 7 is raised up. In this way the path of the guide element 3 is additionally set and moreover rattling noise by striking the gutter 8 is prevented.

The guide element 3 is made in one piece over the entire area shown, therefore including sections 5, 6, and 7. It is preferably a flexible steel rod or leaf spring S sprayed with a plastic coating C mounting on the motor vehicle roof taking place in the area 5 via a plastic mounting element which has been sprayed on. The metal rod has a circular cross section so that the guide element 3 in the area being used as the guide has a crowned, partially circular cross sectional profile having an up-turned edge. Alternatively, the crowned guide area could also be formed by a plastic path which is for example sprayed onto the metal leaf spring.

In summary, therefore FIGS. 1, 2 and 3 show that the cover entrains the sliding head liner 1 in a raising motion from the closed position as shown in FIG. 1 into the raised position as shown in FIG. 2 and the sliding head liner 1 can be pushed out of its raised position in the direction to the open position of the sliding head liner (from FIG. 2 to FIG. 3). FIG. 3 does not show the complete open position of the sliding head liner, because the movable holding device 2 would be moved out of the illustrated area, but shows simply an intermediate stage with the sliding head liner 1 in a partially-opened position.

Figure 4:
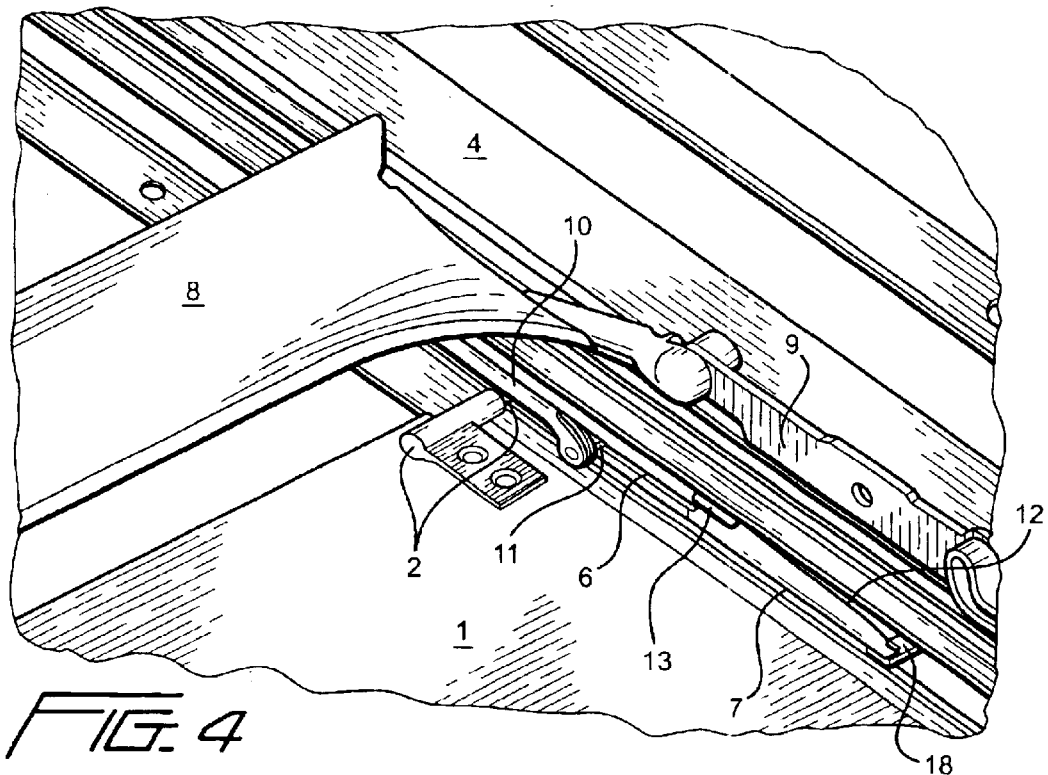
FIG. 4 shows a partial view analogous to FIG. 1 in a situation in which the cover has been pushed a distance in the direction of the cover open position and the sliding head liner has been pushed a distance in the direction of its open position.

FIG. 4 shows how the cover can be moved out of the cover closed position in FIG. 1 in the direction to the cover open position. First, the cover 14 is lowered somewhat in order to be able to be pushed under the actual motor vehicle roof 17; this can be recognized on the position of the lever rod 9 which is flatter in FIG. 4 compared to FIG. 1. Moreover the carrier 11 is moved away somewhat from the outermost area of the movable end 7 of the guide element 3. It is moreover apparent that the carrier 11 during its motion can entrain the holding device 2 and thus the sliding head liner 11 even if in FIG. 4, for the sake of clarity, no direct contact between the carrier 11 and the holding device 2 is shown. Rather, in FIG. 4, the sliding head liner 1 is pushed slightly farther in the direction of its open position relative to its position induced by the cover position.

In FIG. 4, the movable end 7 is no longer held and the carrier 11 has reached the flexible area 6, so that the movable end 7, as a result of the flexibility of the flexible area 6, is freely movable against a certain elasticity of the flexible area 6. In order to prevent chattering noise, for example when driving over uneven ground, at least the outermost area of the movable end 7 is magnetic. Preferably the steel rod contained in the guide element 3 is magnetic. It is held in the lowered position of the guide element 3 on a guide element holding means 18 which is made preferably as a permanent magnet and which is located on a slider which can be moved in the mounting rail 4 and can hold the movable end 7 stationary in the position which corresponds to the elongated straight shape of the entire guide element 3.

On the other hand, the drive mechanism 9 of the cover can easily overcome the forces exerted by the guide element holding means 18 on the movable end 7 and thus can reach the position shown in FIGS. 2 and 3.

We claim:

1. Openable motor vehicle roof, comprising:
    at least one cover which can close a roof opening and which can be raised out of a cover closed position into a cover raised position;
    a sliding head liner located under the at least one cover and moveable concomitantly out of a closed position into a raised position when the at least one cover is raised with the sliding headliner, so that the at least one cover and the sliding head liner jointly clear a ventilation gap, the sliding head liner being slideable furthermore from its closed position into an open position so that the sliding head liner can clear the cover or the roof opening at least for a large part;
    an elongated guide element along which the sliding head liner can be moved into and out of its open position and including a movable end on which the sliding head liner is held in its closed position and, in the liner raised position, is entrained during motion of the sliding head liner between the closed and raised positions, the elongated guide element including a stationary area and a transition area between the stationary area and the movable end;
    a movable holding device mounted on the elongated guide element to hold the sliding head liner on a side on which the sliding head liner can clear the ventilation gap in the raised position of the sliding head liner;
    wherein the sliding head liner is displaceable away from the movable end toward the stationary area with the holding device into the open position of the sliding head liner, wherein the stationary area is stationary in a direction perpendicular to the roof, and wherein the guide element is flexible at least in the transition area between the stationary area and the movable end.

2. The openable motor vehicle roof of claim 1, wherein the stationary area, the transition area and the movable end of the guide element are made in one piece.

3. The openable motor vehicle roof of claim 1, wherein the guide element has an up-turned edge area.

4. The openable motor vehicle roof of claim 1, wherein at least the transition area of the guide element is formed by a flexible metal rod.

5. The openable motor vehicle roof of claim 1, wherein at least the transition area of the guide element comprises a plastic coated metal leaf spring.

6. The openable motor vehicle roof of claim 1, wherein the guide element is a plastic-coated flexible metal part.

7. The openable motor vehicle roof of claim 1, wherein the movable end of the guide element is stiffened over a lengthwise section.

8. The openable motor vehicle roof of claim 1, wherein the cover can be moved into the cover open position in which the cover clears a large part of the roof opening and entrains the sliding head liner into the open position of the sliding head liner via a carrier which is guided on the guide element and which strikes the movable holding device during motion into the roof open position.

9. The openable motor vehicle roof as claimed in claim 8, wherein the carrier is coupled to a means for raising the cover and wherein the movable end of the guide element is raised when the cover is moved into the cover raised position.

10. The openable motor vehicle roof in claim 9, wherein the carrier is attached to a control lever of a gutter, the control lever being coupled to the means for raising the cover.

11. The openable motor vehicle roof of claim 1, further includes a guide element holding means mounted on the roof for holding the movable end of the guide element.

12. The openable motor vehicle roof of claim 11, wherein the guide element holding means is formed by a magnet and the movable end of the guide element is made at least partially magnetic.

* * * * *